(12) United States Patent
Hatsuda et al.

(10) Patent No.: US 7,510,767 B2
(45) Date of Patent: *Mar. 31, 2009

(54) LIQUID ABSORBING SHEET AND NONAQUEOUS ELECTROLYTE BATTERY PACK

(75) Inventors: Kouki Hatsuda, Tochigi (JP); Yasuhiro Fujita, Tochigi (JP); Hironobu Moriyama, Tochigi (JP); Mamiko Nomura, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 10/553,705

(22) PCT Filed: Apr. 1, 2004

(86) PCT No.: PCT/JP2004/004812

§ 371 (c)(1),
(2), (4) Date: Oct. 18, 2005

(87) PCT Pub. No.: WO2004/106395

PCT Pub. Date: Dec. 9, 2004

(65) Prior Publication Data

US 2006/0172199 A1 Aug. 3, 2006

(30) Foreign Application Priority Data

May 30, 2003 (JP) .............................. 2003-154196

(51) Int. Cl.
*B32B 9/04* (2006.01)
(52) U.S. Cl. .................. 428/411.1; 429/57; 429/96; 429/97; 429/98; 429/99; 429/100

(58) Field of Classification Search ............... 428/411, 428/411.1
See application file for complete search history.

(56) References Cited

U.S. PATENT DOCUMENTS

| 4,332,919 | A | * | 6/1982 | Kobayashi et al. | .......... 524/504 |
| 4,929,482 | A | * | 5/1990 | Moritani et al. | ............ 428/36.4 |
| 5,569,557 | A | * | 10/1996 | Wagner et al. | ................. 429/99 |
| 5,663,261 | A | * | 9/1997 | Hori et al. | ................. 526/307.2 |
| 6,087,417 | A | * | 7/2000 | Stevenson et al. | ........... 523/414 |
| 6,696,197 | B2 | * | 2/2004 | Inagaki et al. | ................ 429/120 |
| 7,045,276 | B2 | * | 5/2006 | Takahashi et al. | ........... 430/302 |
| 7,303,819 | B2 | * | 12/2007 | Brotzman, Jr. | ............... 428/407 |

(Continued)

FOREIGN PATENT DOCUMENTS

JP  A-09-040837  2/1997

(Continued)

*Primary Examiner*—Holly Rickman
*Assistant Examiner*—Gary D Harris
(74) *Attorney, Agent, or Firm*—Oliff & Berridge, PLC

(57) ABSTRACT

A liquid absorbing sheet has a liquid-absorbing resin layer that can effectively absorb the nonaqueous electrolyte solution used in nonaqueous electrolyte secondary cells that make nonaqueous electrolyte battery packs (in particular, lithium ion-based nonaqueous secondary battery packs). The liquid-absorbing resin layer is obtained by irradiating a particular monomer composition with UV rays or other energy rays to polymerize the monomer composition. The monomer composition contains a monofunctional monomer component (A) having a polyethylene glycol acrylate monomer and an amide bond-containing acrylic monomer; and a polyfunctional monomer component (B).

5 Claims, 3 Drawing Sheets

U.S. PATENT DOCUMENTS

| | | | |
|---|---|---|---|
| 2004/0234865 A1* | 11/2004 | Sato et al. | 429/322 |
| 2005/0079326 A1* | 4/2005 | Varaprasad et al. | 428/193 |
| 2005/0214529 A1* | 9/2005 | Hasegawa et al. | 428/343 |
| 2006/0172199 A1* | 8/2006 | Hatsuda et al. | 429/249 |
| 2006/0188724 A1* | 8/2006 | Moriyama et al. | 428/411.1 |

FOREIGN PATENT DOCUMENTS

| | | |
|---|---|---|
| JP | A-09-78050 | 3/1997 |
| JP | A 9-235479 | 9/1997 |
| JP | A 9-259930 | 10/1997 |
| JP | A 11-086855 | 3/1999 |
| JP | A 2001-351588 | 12/2001 |
| JP | A 2003-157851 | 5/2003 |
| JP | A 2003-251178 | 9/2003 |
| WO | WO 03/018687 A2 | 3/2003 |
| WO | WO 03/057745 A1 | 7/2003 |

* cited by examiner

LIQUID ABSORBING SHEET AND NONAQUEOUS ELECTROLYTE BATTERY PACK

TECHNICAL FIELD

The present invention relates to a liquid absorbing sheet for absorbing an electrolyte solution when such a solution leaks from a nonaqueous electrolyte battery cell encased in a nonaqueous electrolyte battery pack. The present invention also relates to a nonaqueous electrolyte battery pack that uses such a liquid absorbing sheet.

BACKGROUND ART

Battery packs are widely used that contains a plurality of primary or secondary battery cells, a circuit board, and a battery case encasing these components. When an electrolyte solution leaks from any of the battery cells, it can corrode the wiring of the circuit board, whereby there may occurs a conduction failure or short circuit. To prevent such corrosion and short circuits when leakage of the electrolyte solution occurs, a liquid-absorbing element containing an liquid absorbing agent capable of absorbing the electrolyte solution is arranged in the battery pack adjacent to or in the vicinity of the battery cell (Japanese Patent Application Laid-Open No. 2001-351588). Various polymer materials are used as the liquid absorbing agent, including adsorbents, gelling agents, and self-swelling agents. Among specific examples of the liquid absorbing agents described are polyacrylate-based water-absorbing resins, starch/graft copolymer-based water-absorbing resins, polyvinyl alcohol-based water-absorbing resins, polyacrylamide-based water-absorbing resins, isobutyrene-maleic acid copolymer-based water-absorbing resins, long chain alkyl acrylate crosslinked polymers, and polynorbornens.

One drawback of these liquid absorbing agents is that they cannot effectively absorb propylene carbonate, dimethyl carbonate and other carbonate-based solvents that are widely used in nonaqueous electrolyte battery packs, a type of batteries that have become increasingly used in recent years. Specifically, these solvents are used in nonaqueous electrolyte secondary cells that make lithium ion-based nonaqueous electrolyte secondary battery packs. Another drawback is that these adsorbents show little or no adhesion, so that they cannot be easily stuck to a nonwoven fabric support at room temperature and thus, require a thermal laminator. Furthermore, an adhesive layer must be arranged to apply the liquid absorbing agent to nonaqueous electrolyte secondary battery packs. As a result, the usable amount of the adhesive is decreased by an amount corresponding to the thickness of the adhesive layer.

The present invention addresses the above-described problems and to that end, it is an object of the present invention to provide a liquid absorbing sheet that shows adhesion and is capable of effectively absorbing the nonaqueous electrolyte solution used in nonaqueous electrolyte secondary cells that make nonaqueous electrolyte battery packs (in particular, lithium ion-based nonaqueous secondary battery packs). It is another object of the present invention to provide a battery pack equipped with an electrolyte-absorbing element made of such a liquid absorbing sheet.

DISCLOSURE OF THE INVENTION

In the course of our study, the present inventors have found that a resin layer obtained in a particular manner can absorb and retain significant amounts of an electrolyte solution and shows adhesion, the finding leading to the present invention. Specifically, this resin layer is obtained by irradiating a particular monomer composition with an energy ray to cause it to polymerize. This monomer composition contains a monofunctional monomer component (A) comprising a polyethylene glycol acrylate monomer and an amide bond-containing acrylic monomer; and a polyfunctional monomer component (B).

Specifically, the present invention provides a liquid absorbing sheet having a liquid-absorbing resin layer, wherein the liquid-absorbing resin layer is obtained by irradiating a monomer composition with an energy ray to polymerize the monomer composition, the monomer composition containing a monofunctional monomer component (A) having a polyethylene glycol acrylate monomer and an amide bond-containing acrylic monomer; and a polyfunctional monomer component (B).

The present invention also provides a nonaqueous electrolyte battery pack having a nonaqueous electrolyte battery cell, a circuit board, an electrolyte-absorbing element for absorbing an electrolyte solution in the event of electrolyte leakage from the nonaqueous electrolyte battery cell and a battery case encasing all of the above components, wherein the electrolyte-absorbing element is formed of the above-described liquid absorbing sheet.

BEST MODE FOR CARRYING OUT THE INVENTION

First, a liquid absorbing sheet of the present invention will be described as below.

Figure 1A:
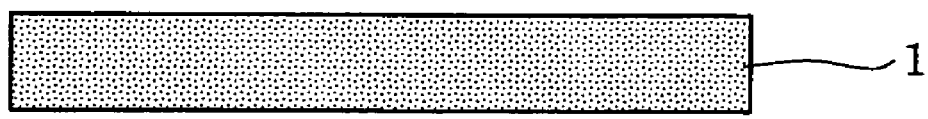
FIGS. 1A and 1B are each a cross-sectional view of a liquid absorbing sheet of the present invention.
Figure 1B:
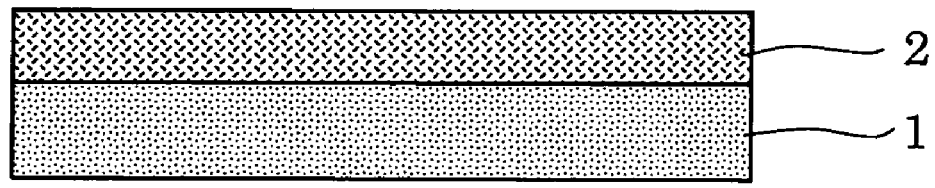

In one embodiment, the liquid absorbing sheet of the present invention can be provided as an independent sheet formed entirely of a liquid absorbing resin layer 1 as shown in FIG. 1A. In another embodiment, the liquid absorbing sheet may consist of a substrate 2 and the liquid-absorbing resin layer 1 disposed on one side of the substrate 2 as shown in FIG. 1B. In the liquid absorbing sheet of the present invention, the liquid-absorbing resin layer 1 can itself absorb and retain significant amounts of an electrolyte solution and itself has adhesion, so that the need to provide a separate adhesive layer is eliminated or even when such an adhesive layer is used, the thickness of the adhesive layer can be made thin. As a result, the proportion by volume of the liquid-absorbing resin layer 1 in the liquid absorbing sheet can be made increased. This facilitates the placement of the liquid absorbing sheet in the battery case.

Although the substrate 2 for use in the liquid absorbing sheet of the present invention may be a resin film that is impermeable to electrolyte solutions (such as a plastic film made of polypropylene or other materials), it may be a material that can absorb and retain the nonaqueous solvent, including nonwoven fabric or synthetic paper formed of plastic fibers such as polypropylene, or other materials. The substrate made of such a nonwoven fabric can absorb the nonaqueous solvent at an increased rate.

The liquid-absorbing resin layer 1 to form the liquid absorbing sheet of the present invention comprises a polymer film obtained by irradiating a particular monomer composition with an energy ray such as ultraviolet ray and electron beam to polymerize the composition, thereby making a sheet. According to the present invention, this monomer composition comprises a monofunctional monomer and a polyfunctional monomer to serve as a crosslinker.

According to the present invention, the monofunctional monomer component (A) comprises a polyethylene glycol acrylate monomer and an amide bond-containing acrylic monomer. The polyethylene glycol acrylate monomer and the amide bond-containing acrylic monomer each form a non-adhesive homopolymer, but, together, they unexpectedly form an adhesive copolymer.

Such a polyethylene glycol acrylate monomer may be a phenoxypolyethylene glycol acrylate with an ethylene oxide-added mol number of preferably 1 to 30, more preferably 6, or it may be a methoxypolyethylene glycol acrylate with an ethylene oxide-added mol number of preferably 1 to 30, more preferably 3 or 9.

Preferably, the amide bond-containing acrylic monomer is acryloylmorpholine or N,N-diethylacrylamide.

The molar ratio of the polyethylene glycol acrylate monomer to the amide bond-containing acrylic monomer to compose the monofunctional monomer component (A) is adjusted to a suitable range, since the adhesion of the liquid absorbing sheet will be decreased if the amount of the former relative to the latter is too much or too less. The amount of the amide bond-containing acrylic monomer is preferably in the range of 20 to 70 parts by weight, more preferably in the range of 40 to 60 parts by weight with respect to 100 parts by weight of the polyethylene glycol acrylate monomer.

According to the present invention, the above-described polyethylene glycol acrylate monomer and the amide bond-containing acrylic monomer must be present in the monofunctional monomer component (A) preferably in a total amount of at least 20 mol %, since too small an amount of these components tends to result in a decreased absorption of the nonaqueous solvent.

As long as the advantages of the present invention are not affected, the monofunctional monomer component (A) may contain, aside from the polyethylene glycol acrylate monomer and the amide bond-containing acrylic monomer, other monofunctional monomers, such as hydroxyethylacrylate, acrylic acid, 2-ethylhexylacrylate, and lauryl acrylate.

According to the present invention, the polyfunctional monomer component (B) serves to introduce crosslinks into the liquid absorbing resin layer 1 and is preferably a monomer having 2 or more acrylate residues. Examples thereof include hydroxypivalic acid neopentyl glycol diacrylate, polyethylene glycol diacrylate (ethylene glycol-added mol number (n)=14), bisphenol A diacrylate, phenyl glycidyl ether acrylate, and hexamethylene diisocyanate prepolymer.

The polyfunctional monomer component (B) is added to the monomer composition in an amount to give a crosslink density of preferably from 0.0001 to 0.17, more preferably from 0.001 to 0.1. Too small an amount of the polyfunctional monomer component (B) may result in a decreased ability of the liquid absorbing resin layer 1 to retain its shape, whereas too large an amount may lead to a decreased ability of the liquid absorbing resin layer 1 to absorb the nonaqueous solvent.

Given that 'a' indicates the number of the functional groups borne by a single molecule of the polyfunctional monomer, 'b' indicates the number of mols of the polyfunctional monomer present in the monomer composition, and 'c' indicates the number of mols of the monofunctional monomer present in the monomer composition, the crosslink density can be defined by the following equation:

$$\text{Crosslink density} = a \times b / (b+c).$$

Figure 1C:
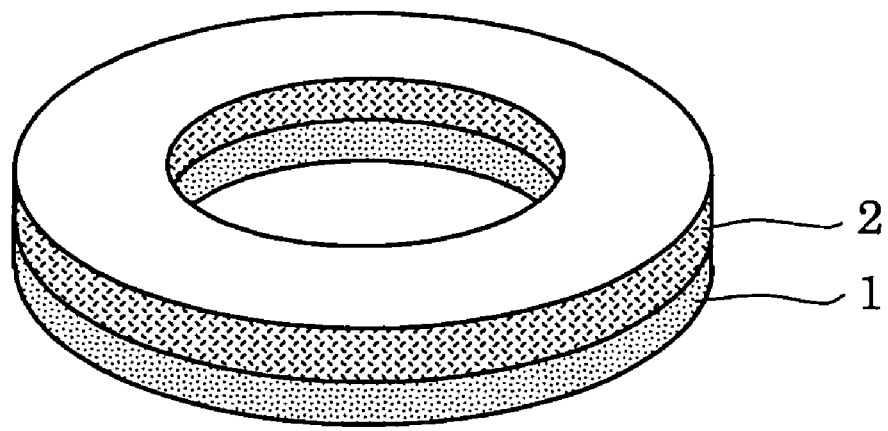
FIG. 1C is a perspective view of the liquid absorbing sheet of the present invention.

The first construction of the liquid absorbing sheet of the present invention as depicted in FIG. 1A can be obtained by coating a peelable film, such as polyethylene terephthalate film, with the above-described monomer composition containing the monofunctional monomer component (A) and the polyfunctional monomer component (B), irradiating the coated film with an energy ray to polymerize the composition and thereby form a sheet, and peeling the sheet off the peelable film. The second construction as depicted in FIG. 1B can be obtained either by coating a nonwoven fabric with the monomer composition and polymerizing the composition, or by laminating a nonwoven fabric onto the first construction of FIG. 1A. The monomer composition can be applied to the peelable sheet or nonwoven fabric by any suitable conventional technique, such as roll coater technique. The polymerization using an energy ray is typically carried out at 15 to 25° C. under the irradiating of a UV ray with a wavelength of 250 to 350 nm at an energy density of 100 to 2000 mJ/cm². When it is desired to attach a nonwoven fabric to the liquid absorbing sheet comprising the single-layered, liquid absorbing resin layer 1 as shown in FIG. 1A, the nonwoven fabric can be easily attached to the liquid absorbing sheet 1, which itself shows adhesion, at room temperature with the help of simple equipment such as hand roller. Considering the fact that the leakage in many cases occurs at the cathode of the cylindrical batteries, the liquid absorbing sheet is preferably shaped as a doughnut-like shape as shown in its plan view in FIG. 1C so that it can be applied about the cathode terminal.

If necessary, a flame retardant (e.g., aluminum hydroxide and melamine cyanurate) may be further added to the liquid-absorbing resin layer 1 of the liquid absorbing sheet of the present invention. This imparts a flame retardancy to the liquid absorbing sheet.

Figure 2:
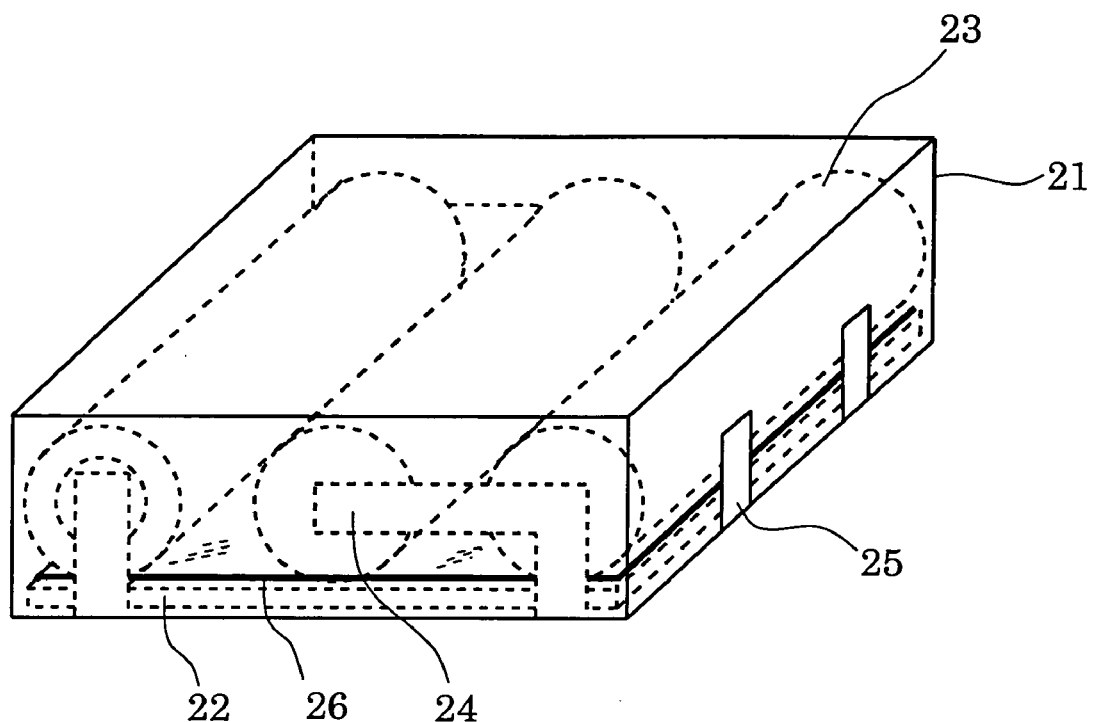
FIG. 2 is a perspective view showing a nonaqueous electrolyte battery pack of the present invention.
Figure 3:
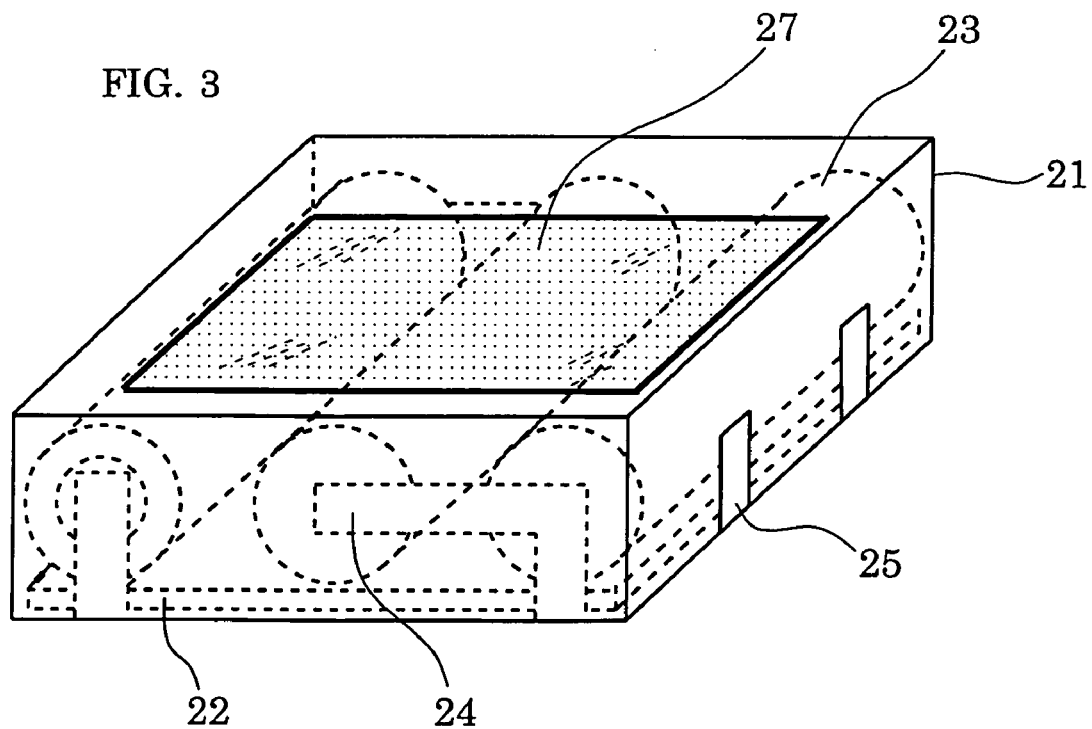
FIG. 3 is a perspective view showing another nonaqueous electrolyte battery pack of the present invention.

The liquid absorbing sheet of the present invention is suitable as an electrolyte-absorbing element used in a nonaqueous electrolyte battery pack that consists of a battery case encasing nonaqueous electrolyte battery cells, a circuit board and the electrolyte-absorbing element. The liquid absorbing sheet serves to absorb the electrolyte solution should leakage occur from the battery cell. One example of such a battery pack is shown in FIG. 2. The battery pack includes a battery case 21, which encases a circuit board 22 and a plurality of nonaqueous electrolyte battery cells 23 arranged on the circuit board 22. A liquid absorbing sheet 26 as described above with reference to FIG. 1A is arranged between the circuit board 22 and the nonaqueous electrolyte battery cells 23 for absorbing the electrolyte solution should leakage occur from any of the nonaqueous electrolyte battery cells. A metal lead 24 connects the circuit board 22 with each of the nonaqueous electrolyte battery cells 23. The metal lead 24 is also connected to external terminals 25. As shown in FIG. 3, a liquid absorbing sheet 27 as described above with reference to FIG. 1B may be arranged on top of the nonaqueous electrolyte battery cells 23 with its substrate facing the nonaqueous electrolyte battery cells 23.

Although the battery cases of the respective nonaqueous electrolyte battery packs shown in FIGS. 2 and 3 are rectangular parallelepiped with cylindrical battery cells, the shape and arrangement of the battery case and the battery cells, as well as the type of the battery cells, are not limited to those shown in the figures and may vary depending on the intended purposes of the batteries.

As set forth, the nonaqueous electrolyte battery packs of the present invention use the liquid absorbing sheet as an element for absorbing the nonaqueous electrolyte solution, where the liquid absorbing sheet comprises the liquid-absorbing resin layer that is obtained by irradiating a monomer composition with UV or other energy rays, the composition contains a monofunctional monomer component (A), which comprises a polyethylene glycol acrylate monomer and an amide bond-containing acrylic monomer, and a polyfunctional monomer component (B). The nonaqueous electrolyte battery packs of the present invention can accordingly offer high absorbability and retainability of the nonaqueous electrolyte solution and significantly reduces the occurrence of corrosion and short circuits of the circuit board even in the event of leakage of the nonaqueous electrolyte solution from the battery cells. The liquid-absorbing resin layer, which itself shows adhesion, makes it possible to easily attach the liquid-absorbing resin layer to a substrate or easily attach the liquid absorbing sheet to the battery pack, at room temperature and without relying on thermal lamination.

EXAMPLES

The present invention will now be described in detail with reference to examples.

Examples 1 Through 6 and Comparative Examples 1 Through 7

A monofunctional monomer(s), polyethylene glycol diacrylate (ethylene oxide-added mol number (n)=14) to serve as a polyfunctional monomer, 2-hydroxy-2-methyl-1-phenyl-propane-1-one (D1173, available from Ciba Specialty Chemicals) to serve as a polymerization initiator were mixed together in the proportions shown in Tables 1 and 2 below. Using a roll coater, the composition was applied to a polyethylene terephthalate film and was irradiated with a UV ray with a wavelength of 365 nm. The UV ray was shone at an energy density of 2000 mJ/cm$^2$ to cause the composition to polymerize and thereby form a polymer film. The polymer film was then peeled off the polyethylene terephthalate film to obtain a single-layered, liquid absorbing sheet.

TABLE 1

| Components | Examples (parts by weight) | | | | | |
|---|---|---|---|---|---|---|
|  | 1 | 2 | 3 | 4 | 5 | 6 |
| Phenoxypolyethylene glycol acrylate (n = 6) | 50 | 50 | — | — | — | — |
| Methoxypolyethylene glycol acrylate (n = 3) | — | — | 50 | 50 | — | — |
| Methoxypolyethylene glycol acrylate (n = 9) | — | — | — | — | 50 | 50 |
| Acryloylmorpholine | 50 | — | 50 | — | 50 | — |
| N,N-diethylacrylamide | — | 50 | — | 50 | — | 50 |
| Polyfunctional monomer | 0.5 | 0.5 | 0.5 | 0.5 | 0.5 | 0.5 |
| Polymerization initiator | 0.5 | 0.5 | 0.5 | 0.5 | 0.5 | 0.5 |

TABLE 2

| Components | Comparative Examples (parts by weight) | | | | | | |
|---|---|---|---|---|---|---|---|
|  | 1 | 2 | 3 | 4 | 5 | 6 | 7 |
| Phenoxypolyethylene glycol acrylate (n = 6) | 100 | — | — | — | — | 50 | — |
| Methoxypolyethylene glycol acrylate (n = 3) | — | 100 | — | — | — | 50 | — |
| Methoxypolyethylene glycol acrylate (n = 9) | — | — | 100 | — | — | — | — |
| Acryloylmorpholine | — | — | — | 100 | — | — | 50 |
| N,N-diethylacrylamide | — | — | — | — | 100 | — | 50 |
| Polyfunctional monomer | 0.5 | 0.5 | 0.5 | 0.5 | 0.5 | 0.5 | 0.5 |
| Polymerization initiator | 0.5 | 0.5 | 0.5 | 0.5 | 0.5 | 0.5 | 0.5 |

Meanwhile, an electrolyte solution was prepared by adding a predetermined amount of a lithium salt as an electrolyte to a mixed solvent containing equal volumes of dimethyl carbonate, propylene carbonate, and ethylene carbonate. 0.2 ml of this electrolyte solution was added dropwise to a 0.03 g piece of the liquid absorbing sheet obtained above and the time it took for the liquid absorbing sheet to completely absorb the electrolyte solution and swell was visually determined. The liquid absorbing sheet was also immersed in a sufficient amount of the electrolyte solution at 23° C. After 3 hours, the appearance of the liquid-absorbing resin layer was visually observed. The liquid absorbing sheet was pulled out of the mixed solvent and the solvent remaining on the surface of the sheet was immediately wiped off. The liquid absorbing sheet was then weighed and its swell ratio was determined. Furthermore, the liquid absorbing sheet was heated in a wet heat oven (40° C., 90% RH, 96 hrs) and was examined for the degree of swelling. The results are shown in Tables 3 and 4 below.

Using hand roller technique (23° C.), a 5 cm wide, 100 μm thick polypropylene nonwoven fabric was laminated onto each side of the liquid absorbing sheet obtained above. The adhesion strength was then determined on a tensile tester (TENSILON, Orientech) in T-peel mode. Also, a 3 cm wide strip of the liquid absorbing sheet was laminated onto an Ni surface using hand roller technique (23° C.). The adhesion strength was then determined on a tensile tester (TENSILON, Orientech) in T-peel mode. The results are shown in Tables 3 and 4 below.

TABLE 3

| Components | Examples | | | | | |
|---|---|---|---|---|---|---|
|  | 1 | 2 | 3 | 4 | 5 | 6 |
| (Degree of swelling) W/O wet heat process | | | | | | |
| Dropwise addition (min) | 80 | 90 | 60 | 70 | 30 | 40 |
| Immersed (times) | 9.3 | 9.5 | 9.0 | 9.2 | 9.4 | 9.6 |

TABLE 3-continued

| Components | Examples | | | | | |
|---|---|---|---|---|---|---|
| | 1 | 2 | 3 | 4 | 5 | 6 |
| (Degree of swelling) With wet heat process | | | | | | |
| Dropwise addition (min) | 100 | 100 | 70 | 80 | 50 | 70 |
| Immersed (times) | 9.2 | 9.3 | 9.0 | 9.1 | 9.2 | 9.5 |
| Adhesion strength to nonwoven fabric | | | | | | |
| Hand roller (kg/5 cm) | 0.3 | 0.2 | 0.2 | 0.1 | 0.4 | 0.08 |
| Adhesion strength to Ni surface | | | | | | |
| Hand roller (kg/3 cm) | 0.3 | 0.1 | 0.2 | 0.1 | 0.4 | 0.08 |

TABLE 4

| Components | Comparative Examples | | | | | | |
|---|---|---|---|---|---|---|---|
| | 1 | 2 | 3 | 4 | 5 | 6 | 7 |
| (Degree of swelling) W/O wet heat process | | | | | | | |
| Dropwise addition (min) | 30 | 40 | 15 | 120< | 120< | 40 | 120< |
| Immersed (times) | 8.5 | 8.7 | 9.0 | 2.3 | 2.0 | 9.1 | 1.8 |
| (Degree of swelling) With wet heat process | | | | | | | |
| Dropwise addition (min) | 40 | 60 | 25 | 120< | 120< | 60 | 120< |
| Immersed (times) | 8.3 | 8.4 | 8.5 | 2.0 | 2.0 | 9.0 | 1.6 |
| Adhesion strength to nonwoven fabric | | | | | | | |
| Hand roller (kg/5 cm) | 0 | 0 | 0 | 0 | 0 | 0 | 0 |
| Adhesion strength to Ni surface | | | | | | | |
| Hand roller (kg/3 cm) | 0 | 0 | 0 | 0 | 0 | 0 | 0 |

The results of Examples 1 through 6 shown in Table 3 indicate that the copolymers formed of one of the polyethylene glycol acrylate monomers and one of the amide bond-containing acrylic monomers each show a high ability to absorb the electrolyte solution with or without wet heat process and have tackiness to the nonwoven fabric support and the nickel surface used in battery cases.

On the other hand, the results of Comparative Examples 1 through 5 shown in Table 4 indicate that the polyethylene glycol acrylate monomer alone or the amide bond-containing acrylic monomer alone does not exhibit tackiness. In addition, the results of Comparative Examples 6 and 7 prove that the copolymer of two polyethylene glycol acrylate monomers or the copolymer of two amide bond-containing acrylic monomers does not exhibit tackiness, either.

Example 7

Figure 4:
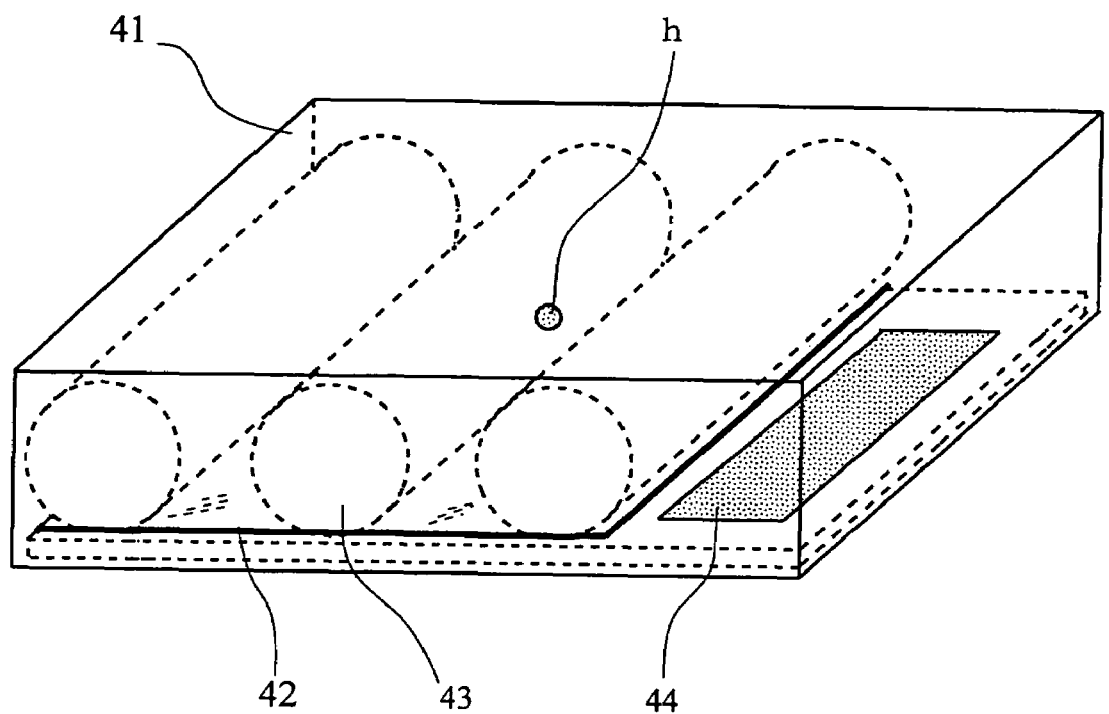
FIG. 4 is a diagram illustrating an electrolyte absorption test conducted using a model battery pack.

Test for the Ability to Absorb an Electrolyte Solution Using a Simulated Battery Pack As shown in FIG. 4, a 7.0 cm (l)×7.9 cm (w)×2.3 cm (h) ABS resin box 41 was obtained. A 6.5 cm (l)×6.5 cm (w)×100 μm-thick liquid absorbing sheet 42 prepared according to Example 1 was stuck to the bottom of the box with a commercially available adhesive. Three lithium ion batteries 43 were placed on the liquid absorbing sheet 42, and a glass epoxy substrate 44 as a circuit board was placed adjacent to the batteries.

A hole h was drilled through the side wall of one of the batteries 43 that was in the middle of the three. The electrolyte solution leaking from the hole was allowed to be absorbed by the liquid absorbing sheet. After drilling of the hole h, the batteries were left for one day and night and the inside of the battery pack was observed. It turned out that the glass epoxy substrate was not wet. In addition, the decrease in weight of the battery with the hole h drilled in it was 2.5 g, which was equal to the increase in weight of the liquid absorbing sheet. These observations suggest that the leaked electrolyte solution was entirely absorbed by the liquid absorbing sheet.

INDUSTRIAL APPLICABILITY

According to the present invention, there is provided a liquid absorbing sheet comprising a liquid-absorbing resin layer that can effectively absorb the nonaqueous electrolyte solution used in nonaqueous electrolyte secondary cells that make nonaqueous electrolyte battery packs (in particular, lithium ion-based nonaqueous secondary battery packs). The liquid-absorbing resin layer, which itself shows adhesion, makes it possible to easily attach the liquid-absorbing resin layer to a substrate or easily attach the liquid absorbing sheet to the battery pack. This attachment is carried out at room temperature and without relying on thermal lamination.

The invention claimed is:

1. A nonaqueous electrolyte battery pack comprising
   a nonaqueous electrolyte battery cell,
   a circuit board,
   a nonaqueous electrolyte-absorbing element for absorbing a nonaqueous electrolyte solution in the event of electrolyte leakage from the nonaqueous electrolyte battery cell, and
   a battery case encasing the battery cell, the circuit board and the nonaqueous electrolyte-absorbing element, wherein the nonaqueous electrolyte-absorbing element is formed of a liquid absorbing sheet for absorbing a nonaqueous electrolyte solution, comprising:
   a liquid-absorbing resin layer capable of absorbing a nonaqueous electrolyte solution and shows adhesion, wherein the liquid-absorbing resin layer comprises a polymer of a monomer composition, the monomer composition containing:
   a monofunctional monomer component (A) comprising a polyethylene glycol acrylate monomer and an amide bond-containing acrylic monomer; and
   a polyfunctional monomer component (B).

2. A nonaqueous electrolyte battery pack comprising
   a nonaqueous electrolyte battery cell,
   a circuit board, a nonaqueous electrolyte-absorbing element for absorbing a nonaqueous electrolyte solution in the event of electrolyte leakage from the nonaqueous electrolyte battery cell, and a battery case encasing the battery cell, the circuit board and the nonaqueous electrolyte-absorbing element, wherein the nonaqueous electrolyte-absorbing element is formed of a liquid absorbing sheet for absorbing a nonaqueous electrolyte solution, comprising:

a liquid-absorbing resin layer capable of absorbing a non-aqueous electrolyte solution and shows adhesion, wherein the liquid-absorbing resin layer comprises a polymer of a monomer composition, the monomer composition containing:

a monofunctional monomer component (A) comprising a polyethylene glycol acrylate monomer and an amide bond-containing acrylic monomer; and a polyfunctional monomer component (B), wherein the polyethylene glycol acrylate monomer is phenoxypolyethylene glycol acrylate or methoxypolyethylene glycol acrylate.

3. A nonaqueous electrolyte battery pack comprising
a nonaqueous electrolyte battery cell,
a circuit board,
a nonaqueous electrolyte-absorbing element for absorbing a nonaqueous electrolyte solution in the event of electrolyte leakage from the nonaqueous electrolyte battery cell, and a battery case encasing the battery cell, the circuit board and the nonaqueous electrolyte-absorbing element, wherein the nonaqueous electrolyte-absorbing element is formed of a liquid absorbing sheet for absorbing a nonaqueous electrolyte solution, comprising:

a liquid-absorbing resin layer capable of absorbing a non-aqueous electrolyte solution and shows adhesion, wherein the liquid-absorbing resin layer comprises a polymer of a monomer composition, the monomer composition containing:

a monofunctional monomer component (A) comprising a polyethylene glycol acrylate monomer and an amide bond-containing acrylic monomer; and a polyfunctional monomer component (B), wherein the amide bond-containing acrylic monomer is acryloylmorpholine or N,N-diethylacrylamide.

4. A nonaqueous electrolyte battery pack comprising
a nonaqueous electrolyte battery cell,
a circuit board,
a nonaqueous electrolyte-absorbing element for absorbing a nonaqueous electrolyte solution in the event of electrolyte leakage from the nonaqueous electrolyte battery cell, and a battery case encasing the battery cell, the circuit board and the nonaqueous electrolyte-absorbing element, wherein the nonaqueous electrolyte-absorbing element is formed of a liquid absorbing sheet for absorbing a nonaqueous electrolyte solution, comprising:

a liquid-absorbing resin layer capable of absorbing a non-aqueous electrolyte solution and shows adhesion, wherein the liquid-absorbing resin layer comprises a polymer of a monomer composition, the monomer composition containing:

a monofunctional monomer component (A) comprising a polyethylene glycol acrylate monomer and an amide bond-containing acrylic monomer; and a polyfunctional monomer component (B), wherein the liquid-absorbing resin layer is formed over a substrate.

5. A nonaqueous electrolyte battery pack comprising
a nonaqueous electrolyte battery cell,
a circuit board,
a nonaqueous electrolyte-absorbing element for absorbing a nonaqueous electrolyte solution in the event of electrolyte leakage from the nonaqueous electrolyte battery cell, and a battery case encasing the battery cell, the circuit board and the nonaqueous electrolyte-absorbing element, wherein the nonaqueous electrolyte-absorbing element is formed of a liquid absorbing sheet for absorbing a nonaqueous electrolyte solution, comprising:

a liquid-absorbing resin layer capable of absorbing a non-aqueous electrolyte solution and shows adhesion, wherein the liquid-absorbing resin layer comprises a polymer of a monomer composition, the monomer composition containing:

a monofunctional monomer component (A) comprising a polyethylene glycol acrylate monomer and an amide bond-containing acrylic monomer; and a polyfunctional monomer component (B), wherein the liquid-absorbing resin layer is formed over a substrate and the substrate is capable of absorbing and retaining a nonaqueous electrolyte solution.

* * * * *